United States Patent
Xie et al.

(10) Patent No.: US 11,071,080 B2
(45) Date of Patent: Jul. 20, 2021

(54) INFORMATION RECEIVING METHOD, INFORMATION SENDING METHOD, AND DEVICE

(71) Applicant: HUAWEI TECHNOLOGIES CO., LTD., Shenzhen (CN)

(72) Inventors: Xinqian Xie, Beijing (CN); Zhiheng Guo, Beijing (CN); Wei Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/508,297

(22) Filed: Jul. 10, 2019

(65) Prior Publication Data

US 2019/0335411 A1 Oct. 31, 2019

Related U.S. Application Data

(63) Continuation of application No. PCT/CN2017/119800, filed on Dec. 29, 2017.

(30) Foreign Application Priority Data

Jan. 10, 2017 (CN) .......................... 201710016834.5

(51) Int. Cl.
*H04B 7/024* (2017.01)
*H04B 7/0491* (2017.01)
(Continued)

(52) U.S. Cl.
CPC ........ *H04W 56/0045* (2013.01); *H04B 7/024* (2013.01); *H04B 7/0491* (2013.01);
(Continued)

(58) Field of Classification Search
CPC .......... H04B 7/02–0495; H04J 11/0023–0093; H04J 2011/0003–0096;
(Continued)

(56) References Cited

U.S. PATENT DOCUMENTS

2010/0222068 A1 9/2010 Gaal et al.
2012/0003970 A1 1/2012 Iwamura
(Continued)

FOREIGN PATENT DOCUMENTS

CN 1553586 A 12/2004
CN 102282878 A 12/2011
(Continued)

OTHER PUBLICATIONS

3GPP TSG RAN WG1 NR Ad-Hoc Meeting, R1-1700095,: "On cross-link interference cancellation/suppression for duplexing flexibility", Huawei, HiSilicon, Spokane, USA, Jan. 16-20, 2017, total 6 pages.
(Continued)

*Primary Examiner* — Timothy J Weidner
(74) *Attorney, Agent, or Firm* — Kilpatrick Townsend & Stockton LLP (57) ABSTRACT

An information receiving method, an information sending method, and a device are provided. Under these methods, a timing adjustment amount can be determined by a first access network device. The timing adjustment amount is an adjustment amount between a first timing at which the first access network device sends a first downlink signal to a first terminal device on a first frequency band and a second timing at which the first access network device sends a second downlink signal to the first terminal device on a second frequency band. The first frequency band and the second frequency band are paired frequency bands. First indication information can be sent, by the first access network device, to the first terminal device. The first indication information indicates the timing adjustment amount.

6 Claims, 7 Drawing Sheets

(51) Int. Cl.

| | | |
|---|---|---|
| *H04J 11/00* | (2006.01) | |
| *H04L 5/00* | (2006.01) | |
| *H04L 27/26* | (2006.01) | |
| *H04W 8/24* | (2009.01) | |
| *H04W 56/00* | (2009.01) | |
| *H04W 72/04* | (2009.01) | |
| *H04W 72/08* | (2009.01) | |
| *H04W 84/04* | (2009.01) | |
| *H04W 88/02* | (2009.01) | |
| *H04W 88/08* | (2009.01) | |
| *H04W 92/10* | (2009.01) | |
| *H04W 92/20* | (2009.01) | |

(52) U.S. Cl.
CPC ....... *H04J 11/0053* (2013.01); *H04J 11/0056* (2013.01); *H04L 5/0073* (2013.01); *H04L 5/0083* (2013.01); *H04L 27/2607* (2013.01); *H04L 27/2646* (2013.01); *H04L 27/2662* (2013.01); *H04W 8/245* (2013.01); *H04W 56/005* (2013.01); *H04W 56/0015* (2013.01); *H04W 72/042* (2013.01); *H04W 72/0446* (2013.01); *H04W 72/0453* (2013.01); *H04W 72/082* (2013.01); *H04J 2011/002* (2013.01); *H04J 2011/0096* (2013.01); *H04W 84/042* (2013.01); *H04W 88/02* (2013.01); *H04W 88/08* (2013.01); *H04W 92/10* (2013.01); *H04W 92/20* (2013.01)

(58) Field of Classification Search
CPC ..... H04L 5/0001–26; H04L 27/26–30; H04W 8/22–245; H04W 24/02–10; H04W 48/02–16; H04W 56/0005–0095; H04W 72/005–14; H04W 74/002–06; H04W 84/02; H04W 84/04–047; H04W 88/02; H04W 88/04–12; H04W 92/02; H04W 92/04; H04W 92/10; H04W 92/12; H04W 92/16; H04W 92/20

See application file for complete search history.

(56) References Cited

U.S. PATENT DOCUMENTS

| | | | |
|---|---|---|---|
| 2012/0170570 A1* | 7/2012 | Chang | ................ H04W 56/005 |
| 2013/0107793 A1 | 5/2013 | Gan et al. | |
| 2013/0215785 A1 | 8/2013 | Jung et al. | |
| 2015/0215879 A1 | 7/2015 | Zhu et al. | |
| 2019/0037512 A1* | 1/2019 | Dinan | ................ H04W 56/0005 |

FOREIGN PATENT DOCUMENTS

| | | |
|---|---|---|
| CN | 102342049 A | 2/2012 |
| CN | 103891171 A | 6/2014 |
| EP | 2389027 A1 | 11/2011 |
| EP | 2720500 A1 | 4/2014 |
| IN | 201627012826 A | 8/2016 |
| JP | 2006270573 A | 10/2006 |
| WO | 2011023057 A1 | 3/2011 |

OTHER PUBLICATIONS

3GPP TSG RAN WG1 Meeting #86bis , R1-1610415:"Discussion on flexible duplex operations in NR design",LG Electronics,Lisbon,. Portugal Oct. 10-14, 2016,total 8 pages.

Huawei, HiSilicon, General discussion on flexible duplex. 3GPP TSG RAN WG1 Meeting #86bis Lisbon, Portugal, Oct. 10-14, 2016, R1-1609421, 5 pages.

Huawei, HiSilicon, Timing Alignment on Cross-link for Flexible Duplex. 3GPP TSG RAN WG1 Meeting #87 Reno, USA, Nov. 14-18, 2016, R1-1611227, 5 pages.

ZTE, ZTE Microelectronics, Overview of Duplexing and Cross-link Interference Mitigation. 3GPP TSG RAN WG1 AH_NR#1 Meeting Spokane, Washington, USA, Jan. 16-20, 2017, R1-1700269, 12 pages.

* cited by examiner

FIG. 9

INFORMATION RECEIVING METHOD, INFORMATION SENDING METHOD, AND DEVICE

CROSS-REFERENCE TO RELATED APPLICATIONS

This application is a continuation of International Application No. PCT/CN2017/119800, filed on Dec. 29, 2017, which claims priority to Chinese Patent Application No. 201710016834.5, filed on Jan. 10, 2017. The disclosures of the aforementioned applications are hereby incorporated by reference in their entireties.

TECHNICAL FIELD

This application relates to the field of communications technologies, and in particular, to an information receiving method, an information sending method, and a device.

BACKGROUND

In a long term evolution (Long Term Evolution, LTE)/long term evolution advanced (Long Term Evolution Advanced, LTE-A) communications system, duplex modes are mainly classified into a frequency division duplex (Frequency Division Duplex, FDD) mode and a time division duplex (Time Division Duplex, TDD) mode. In a wireless communications system working in the FDD mode, there are simultaneously two symmetrical frequency bands used for information transmission. One frequency band is used for downlink transmission from an access network device to a terminal device, and the other frequency band is used for uplink transmission from the terminal device to the access network device.

However, considering that user terminal devices in the wireless communications system are not evenly distributed, communication services are different. A difference between a downlink service volume and an uplink service volume of a cell covered by a same pair of paired frequency bands is relatively large at a same moment, while a downlink frequency band in the paired frequency bands has a same bandwidth as an uplink frequency band in the paired frequency bands, and consequently a requirement of a service in each cell cannot be met. To improve utilization of a network transmission resource, a flexible duplex technology may be used. To be specific, uplink transmission is performed on downlink data on an uplink frequency band, and transmission in each cell may be independently configured. For example, a transmission time of transmitting downlink data by using an uplink spectrum is determined based on a ratio of uplink services to downlink services in a current cell.

Figure 1:
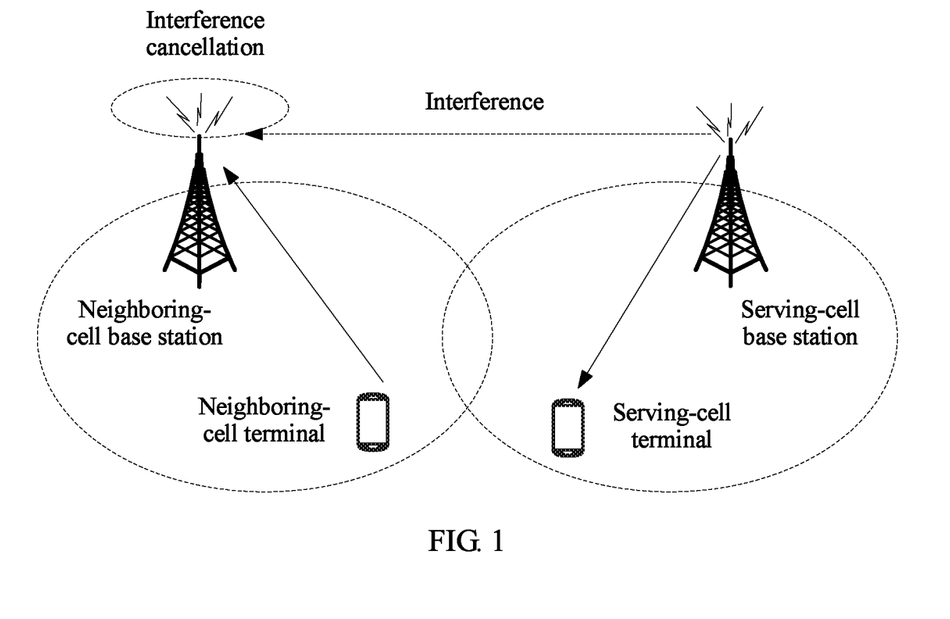
FIG. 1 is a schematic diagram of interference to a neighboring cell that is caused by transmitting downlink data on an uplink frequency band in a serving cell according to the prior art.

In this case, as shown in FIG. 1, in a same transmission time interval (Transmission Time Interval, TTI), when an uplink frequency band in a serving cell is used for downlink transmission, the uplink frequency band in one or more neighboring cells is still used for uplink transmission. Because a transmit power of an access network device is much higher than a transmit power of a terminal device, when a neighboring-cell access network device receives, on an uplink frequency band, uplink information sent by a terminal device of a user in a cell served by the neighboring-cell access network device, the neighboring-cell access network device also receives a downlink signal sent by a serving-cell access network device on the frequency band, resulting in severe interference. Therefore, an interference cancellation technology is used on an access network device end in the neighboring cell to cancel interference caused by the serving cell to the neighboring cell.

Figure 2:
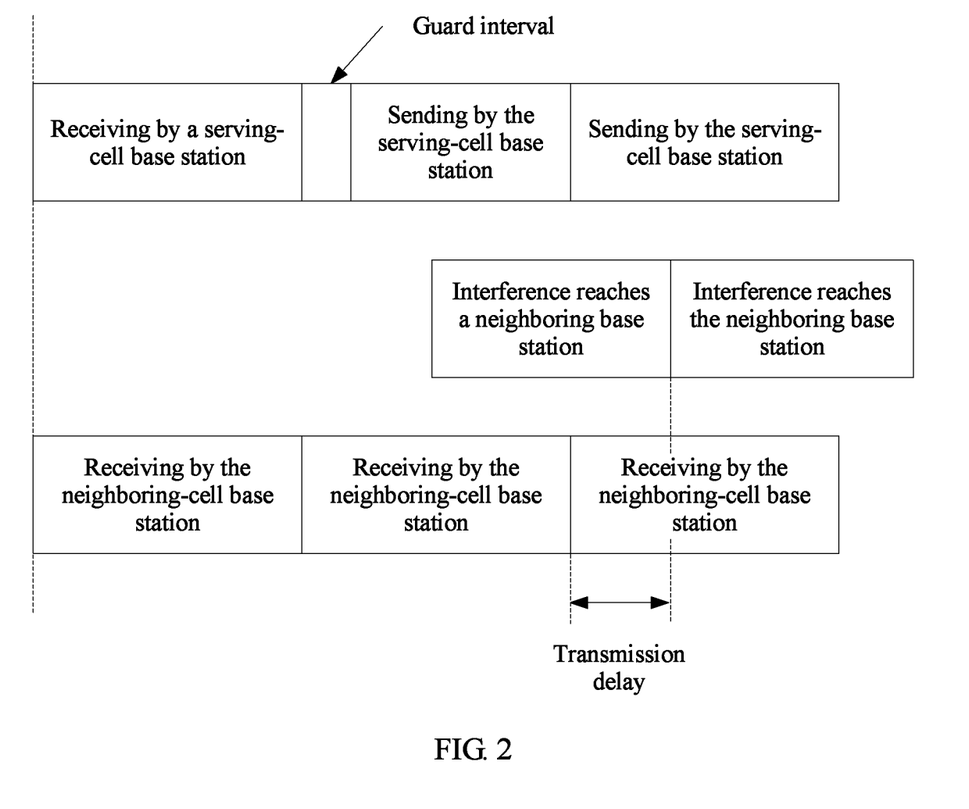
FIG. 2 is a schematic diagram of a transmission delay existing when a downlink signal transmitted on an uplink frequency band in a serving cell reaches a neighboring-cell access network device according to the prior art.

However, as shown in FIG. 2, in the prior art, for an access network device working on paired frequency bands, an uplink receiving timing of the access network device is the same as a downlink sending timing, and all access network devices in cells located in a neighboring area use the same sending timing and receiving timing. Due to a relatively long distance between neighboring access network devices, there is an inevitable transmission delay between a time at which a downlink signal sent by a serving cell on an uplink frequency band reaches a neighboring-cell access network device and a receiving timing of the neighboring-cell access network device. If the transmission delay causes a case that a difference between the transmission delay existing when the downlink signal sent by a serving-cell access network device reaches the neighboring-cell access network device and a transmission delay existing when an uplink signal sent by a neighboring-cell terminal device reaches the neighboring-cell access network device is not within a cyclic prefix (Cyclic Prefix, CP) of an orthogonal frequency division multiplexing (Orthogonal Frequency Division Multiplexing, OFDM) symbol, the neighboring-cell access network device cannot resolve intersymbol interference (inter-symbol interference, ISI) and inter-carrier interference (inter-carrier interference, ICI).

SUMMARY

This application provides an information receiving method, an information sending method, and a device, to provide a means for enabling a terminal device to obtain a timing of a downlink signal.

A first aspect of this application provides an information sending method, where the method includes: determining, by a first access network device, a timing adjustment amount, where the timing adjustment amount is an adjustment amount between a first timing at which the first access network device sends a first downlink signal to a first terminal device on a first frequency band and a second timing at which the first access network device sends a second downlink signal to the first terminal device on a second frequency band, and the first frequency band and the second frequency band are paired frequency bands; and sending, by the first access network device, first indication information to the first terminal device, where the first indication information indicates the timing adjustment amount.

In a possible design, the timing adjustment amount is used by the first terminal device to determine a timing of receiving the first downlink signal on the first frequency band. The first terminal device can adjust, based on the timing adjustment amount, the timing of receiving the first downlink signal. In a possible implementation, the method further includes: sending, by the first access network device, second indication information to the first terminal device, where the second indication information indicates that the first terminal device uses the timing adjustment amount indicated by the first indication information. In this case, the first terminal device can adjust, according to an indication of the first access network device, the timing of receiving the first downlink signal.

In a possible design, the first access network device sends a physical downlink control channel scrambling code to the first terminal device. When scrambling is performed by using a first scrambling code, it indicates that the first terminal device does not use the time adjustment amount to determine the receiving timing of the first downlink signal. When scrambling is performed by using a second scrambling code, it indicates that the first terminal device uses the time adjustment amount to determine the receiving timing of the first downlink signal.

In a possible implementation, the method further includes: sending, by the first access network device, the first downlink signal to the first terminal device on the first frequency band, where a second access network device receives an uplink signal from a second terminal device on the first frequency band, and when the first downlink signal reaches the second access network device, a symbol carrying the first downlink signal is aligned with a symbol carrying the uplink signal, or a time difference between a symbol carrying the first downlink signal and a symbol carrying the uplink signal is less than or equal to a length of a cyclic prefix, where the cyclic prefix is a cyclic prefix with a smaller length in a cyclic prefix of the symbol carrying the first downlink signal and a cyclic prefix of the symbol carrying the uplink signal. Therefore, the second access network device can cancel interference of the first downlink signal.

A second aspect of this application provides an information receiving method, where the method includes: receiving, by a first terminal device, first indication information from a first access network device, where the first indication information indicates a timing adjustment amount; determining, by the first terminal device based on the timing adjustment amount and a second timing at which the first terminal device receives a second downlink signal from the first access network device on a second frequency band, a first timing at which the first terminal device receives a first downlink signal from the first access network device on a first frequency band; and receiving, by the first terminal device, the first downlink signal based on the first timing. In this case, the first terminal device can determine, based on the timing adjustment amount, the timing of receiving the first downlink signal.

In a possible implementation, the method further includes: receiving, by the first terminal device, second indication information from the first access network device, where the second indication information indicates that the first terminal device uses the timing adjustment amount indicated by the first indication information; and the determining, by the first terminal device, the first timing includes: determining, by the first terminal device based on the second indication information, the timing adjustment amount, and the second timing at which the first terminal device receives the second downlink signal from the first access network device on the second frequency band, the first timing at which the first terminal device receives the first downlink signal from the first access network device on the first frequency band. The first terminal device may determine, by using the timing adjustment amount, the timing of receiving the first downlink signal.

A third aspect of this application provides an information sending method, where the method includes: determining, by a first access network device, a first timing adjustment amount, where the first timing adjustment amount is an adjustment amount between a first timing at which the first access network device sends a first downlink signal to a first terminal device on a first frequency band and a second timing at which the first access network device sends a second downlink signal to the first terminal device on a second frequency band, and the first frequency band and the second frequency band are paired frequency bands; and sending, by the first access network device, first indication information and second indication information to the first terminal device, where the first indication information indicates the first timing adjustment amount, and the second indication information is used to indicate whether the first terminal device uses a second timing adjustment amount or the first timing adjustment amount. The first access network device can indicate the timing at which the first terminal device receives the first downlink signal.

In a possible implementation, the method includes: the second timing adjustment amount is a preset value. In this case, the first terminal device may adjust, based on the preset second timing adjustment amount instead of the first timing adjustment amount, the timing of receiving the first downlink signal.

In a possible implementation, the preset value of the second timing adjustment amount is 0. The first timing is aligned with the second timing when the preset value of the second timing adjustment amount is 0.

In a possible implementation, the method further includes: receiving, by a second access network device, an uplink signal from a second terminal device on the first frequency band, where when the first downlink signal reaches the second access network device, a symbol carrying the first downlink signal is aligned with a symbol carrying the uplink signal, or a time difference between a symbol carrying the first downlink signal and a symbol carrying the uplink signal is less than or equal to a length of a cyclic prefix, where the cyclic prefix is a cyclic prefix with a smaller length in a cyclic prefix of the symbol carrying the first downlink signal and a cyclic prefix of the symbol carrying the uplink signal. Therefore, the second access network device can cancel interference of the first downlink signal.

A fourth aspect of this application provides an information receiving method, where the method includes: receiving, by a first terminal device, first indication information from a first access network device, where the first indication information indicates a first timing adjustment amount; receiving, by the first terminal device, second indication information from the first access network device, where the second indication information indicates whether the first terminal device uses a second timing adjustment amount or the first timing adjustment amount; determining, by the first terminal device based on the first timing adjustment amount or the second timing adjustment amount indicated by the second indication information, and a second timing at which the first terminal device receives a second downlink signal from the first access network device on a second frequency band, a first timing at which the first terminal device receives a first downlink signal from the first access network device on a first frequency band; and receiving, by the first terminal device, the first downlink signal based on the first timing.

In an implementation, the method includes: the second timing adjustment amount is a preset value.

In an implementation, the method includes: the preset value of the second timing adjustment amount is 0.

In a design, the first timing is aligned with the second timing when the preset value of the second timing adjustment amount is 0.

According to another aspect, an embodiment of the present invention provides a terminal device. The terminal device can implement a function performed by the terminal device in the foregoing implementations. The function may be implemented by hardware, or may be implemented by hardware by executing corresponding software. The hardware or the software includes one or more modules corresponding to the foregoing function.

In a design, a structure of the terminal device includes a processor and a transceiver. The processor is configured to support the terminal device in performing a corresponding function in the foregoing method. The transceiver is configured to support communication between the terminal device and an access network device. The terminal device may further include a memory. The memory is configured to be coupled to the processor, and the memory stores a program instruction and data that are necessary for the terminal device.

According to another aspect, an embodiment of the present invention provides an access network device. The access network device has a function of implementing behavior of the access network device in the foregoing implementations. The function may be implemented by hardware, or may be implemented by hardware by executing corresponding software. The hardware or the software includes one or more modules corresponding to the foregoing function.

In a design, the access network device includes a processor. The processor is configured to support the access network device in performing a corresponding function in the foregoing method. Further, the access network device may include a communications interface. The communications interface is configured to support communication with a terminal device. Further, the access network device may include a memory. The memory is configured to be coupled to the processor, and the memory stores a program instruction and data that are necessary for an access node.

According to still another aspect, an embodiment of the present invention provides a computer storage medium, configured to store a computer software instruction used by the foregoing terminal device, where the computer software instruction includes a program designed to execute the foregoing aspect.

According to still another aspect, an embodiment of the present invention provides a computer storage medium, configured to store a computer software instruction used by the foregoing access network device, where the computer software instruction includes a program designed to execute the foregoing aspect.

According to still another aspect, an embodiment of the present invention provides a computer program product, where the computer program product includes an instruction, and when the program is executed by a computer, the instruction enables the computer to perform a function performed by the terminal device in the foregoing method design.

According to still another aspect, an embodiment of the present invention provides a computer program product, where the computer program product includes an instruction, and when the program is executed by a computer, the instruction enables the computer to perform a function performed by the access network device in the foregoing method design.

In this application, the first access network device sends the time adjustment amount to the first terminal device, so that the first terminal device can learn of the timing of receiving, on the first frequency band, the downlink signal sent by the first access network device, to correctly receive the downlink signal.

DESCRIPTION OF EMBODIMENTS

The terms used in the embodiments of the present invention are merely for the purpose of illustrating specific embodiments, and are not intended to limit the present invention. The terms "a", "said" and "the" of singular forms used in the embodiments and the appended claims of the present invention are also intended to include plural forms, unless otherwise specified in the context clearly. It should be further understood that "first" and "second" in this specification are also intended to distinguish between technical terms during description, to facilitate understanding by a user, and should not be construed as a limitation on the technical terms.

The following describes the technical solutions in the embodiments of the present invention with reference to the accompanying drawings in this specification.

As shown in FIG. 1, a serving-cell access network device sends a downlink signal to a serving-cell terminal device on an uplink frequency band. When the downlink signal reaches a neighboring-cell access network device, uplink receiving by the neighboring-cell access network device is interfered. The serving-cell terminal device receives, on the uplink frequency band, the downlink signal sent by the serving-cell access network device. The neighboring-cell access network device receives, on the uplink frequency band, an uplink signal sent by a neighboring-cell terminal device, and receives the downlink signal sent by the serving-cell access network device, resulting in interference to signal receiving by the neighboring-cell access network device. The neighboring-cell terminal device sends the uplink signal to the neighboring-cell access network device on the uplink frequency band.

It should be noted that the serving-cell access network device sends the downlink signal on the uplink frequency band, the downlink signal is sent to a plurality of neighboring-cell access network devices, and transmission times consumed by the downlink signal to reach all the neighboring-cell access network devices are different. Therefore, the serving-cell access network device may determine a time adjustment amount for each neighboring-cell access network device interfered by the downlink signal, so that when a symbol in the downlink signal reaches the neighboring-cell access network device, the symbol is aligned with a symbol in which the neighboring-cell access network device receives the uplink signal sent by the neighboring-cell terminal device. Alternatively, the serving-cell access network device may determine one time adjustment amount for all the plurality of neighboring-cell access network devices, so that when a symbol in the downlink signal reaches the neighboring-cell access network device, a time difference between the symbol and a symbol in which the neighboring-cell access network device receives the uplink signal sent by the neighboring-cell terminal device is within a cyclic prefix. This is not limited in this embodiment of the present invention.

Figure 3:
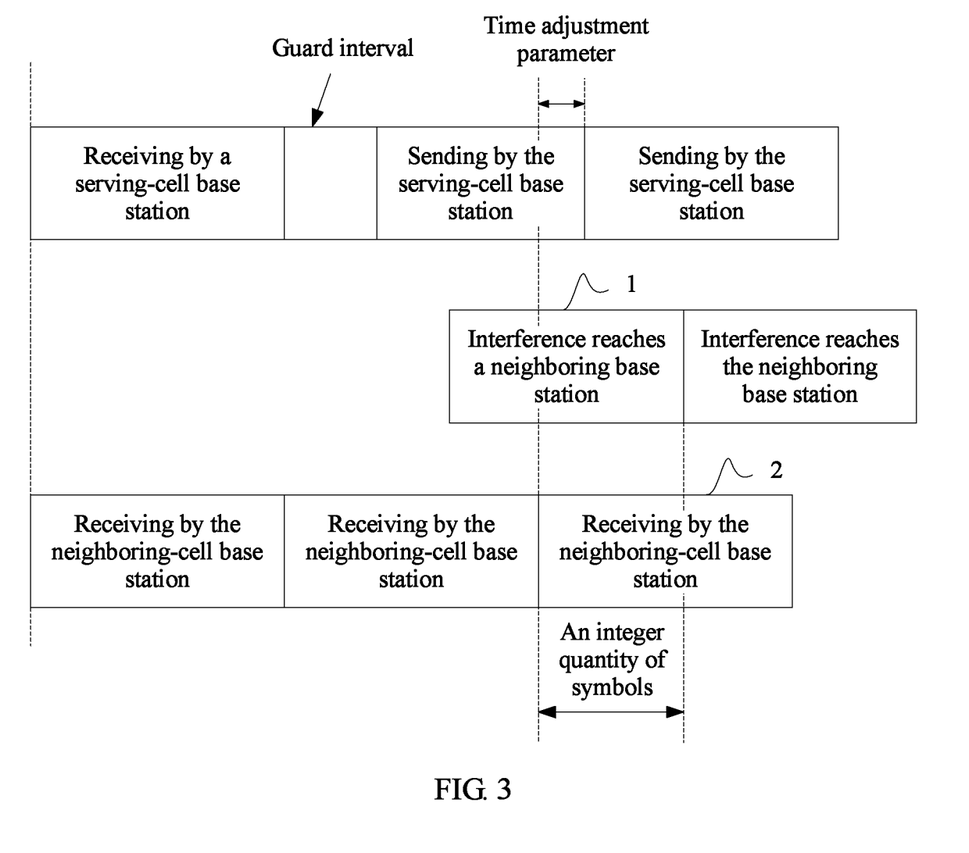
FIG. 3 is a schematic diagram of a transmission delay existing when a downlink signal transmitted on an uplink frequency band in a serving cell reaches a neighboring-cell access network device according to an embodiment of the present invention.

FIG. 3 is a schematic diagram of a transmission delay existing when a downlink signal transmitted on an uplink frequency band in a serving cell reaches a neighboring-cell access network device according to an embodiment of the present invention.

As shown in FIG. 3, in this embodiment of the present invention, a serving-cell access network device sets a time adjustment amount, and determines, based on the time adjustment amount, a timing of sending a downlink signal on an uplink frequency band. The timing of sending the downlink signal is adjusted on the uplink frequency band for the serving-cell access network device, so that when a subframe reaches a receive window of the neighboring-cell access network device, a transmission delay is an integer quantity of OFDM symbols, and a transmission delay difference between a subframe 1 in which interference reaches the window of the neighboring access network device and a subframe 2 in the receive window of the neighboring-cell access network device is within a cyclic prefix of an OFDM symbol in the subframe 1, or a symbol in the subframe 1 is aligned with a time domain symbol in the subframe 2. In this case, the neighboring-cell access network device can resolve ISI of OFDM symbols and ICI interference.

When a signal using an OFDM manner is transmitted, inter-OFDM symbol interference ISI and ICI occur due to a channel multipath characteristic. A guard interval is set for an OFDM symbol, and an idle guard interval is filled with a cyclic prefix (Cyclic Prefix, CP) to restrain the ISI and/or the ICI. To be specific, when multipath transmission is performed on the OFDM symbol, if a transmission delay difference is less than or equal to a time length of the cyclic prefix CP of the OFDM symbol, or OFDM symbols reaching an access network device through multipath transmission are aligned with each other, it can be ensured that a fast Fourier transformation (Fast Fourier Transformation, FFT) integral range includes an integer quantity of OFDM symbols in each subframe on each path, so that multipath transmission interference can be resolved. This process is not described in detail in this embodiment of the present invention.

Figure 4:
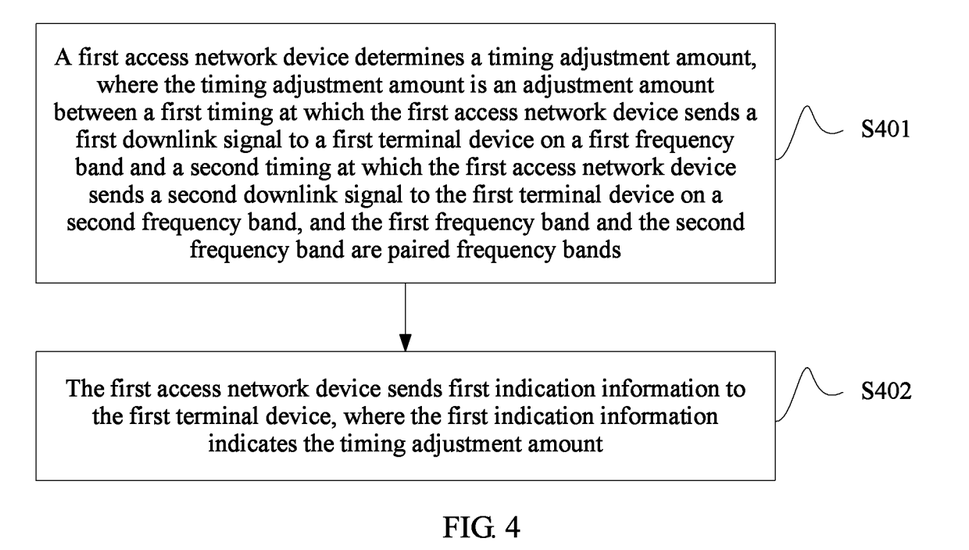
FIG. 4 is a schematic flowchart of an information sending method according to an embodiment of the present invention.

The following uses FIG. 4 as an example to describe in detail a method in an embodiment of the present invention. FIG. 4 is a schematic flowchart of a communication method according to an embodiment of the present invention. As shown in FIG. 4, the method includes steps S401 and S402.

S401. A first access network device determines a timing adjustment amount, where the timing adjustment amount is an adjustment amount between a first timing at which the first access network device sends a first downlink signal to a first terminal device on a first frequency band and a second timing at which the first access network device sends a second downlink signal to the first terminal device on a second frequency band, and the first frequency band and the second frequency band are paired frequency bands.

In this embodiment of the present invention, that the first frequency band is an uplink frequency band and the second frequency band is a downlink frequency band is merely used for illustration. The second access network device may be a neighboring access network device of the first access network device, or may be an access network device that is relatively far away from the first access network device. A quantity of second access network devices is not intended to be limited. The first terminal device is a terminal device in a cell served by the first access network device, and a second terminal device is a terminal device in a cell served by the second access network device.

It should be noted that the timing adjustment amount is used by the first terminal device to determine a timing of receiving the first downlink signal on the uplink frequency band. The first terminal device can adjust, based on the timing adjustment amount, the timing of receiving the first downlink signal.

The method further includes: adjusting, by the first access network device based on the time adjustment amount, the timing of sending the first downlink signal to the first terminal device on the first frequency band; and sending, by the first access network device, the first downlink signal to the first terminal device on the first frequency band, where the second access network device receives an uplink signal from the second terminal device on the first frequency band, and when the first downlink signal reaches the second access network device, a symbol carrying the first downlink signal is aligned with a symbol carrying the uplink signal; or a time difference between a symbol carrying the first downlink signal and a symbol carrying the uplink signal is less than or equal to a length of a cyclic prefix, where the cyclic prefix is a cyclic prefix with a smaller length in a cyclic prefix of the symbol carrying the first downlink signal and a cyclic prefix of the symbol carrying the uplink signal. Therefore, the second access network device can cancel interference of the first downlink signal.

That a first access network device determines a time adjustment amount includes: the first access network device determines the time adjustment amount based on a time at which the second access network device receives the first downlink signal on the uplink frequency band.

In an example, after obtaining the first timing of sending the first downlink signal on the uplink frequency band, the first access network device determines the time adjustment amount based on a difference between the first timing at which the first access network device sends the first downlink signal on the uplink frequency band and the second timing at which the first access network device sends the second downlink signal on the downlink frequency band.

Alternatively, the first access network device may not directly determine the time adjustment amount. The first access network device obtains the first timing of sending the first downlink signal on the uplink frequency band, determines a difference between the timing of the first downlink signal and the second timing of the second downlink signal, and sends the difference to the first terminal device.

It should be noted that the first access network device may determine the time adjustment amount based on the timing at which the second access network device receives the first downlink signal on the uplink frequency band. Alternatively, the first access network device may determine the time adjustment amount based on a transmission time consumed by the first downlink signal to reach the second access network device. Alternatively, the first access network device may determine the time adjustment amount based on a distance between the first access network device and the second access network device. This is not limited in this embodiment of the present invention.

In an example, a time difference between a symbol of the transmission time of the first downlink signal and a symbol in which an uplink subframe sent by the second terminal device reaches the second access network device is determined based on the transmission time, and the time adjustment amount is determined based on the time difference between the symbols. For example, the first access network device determines, based on the transmission time NDelay consumed by the first downlink signal sent on the uplink frequency band to reach the second access network device, a time difference Noffset between an OFDM symbol of the transmission time NDelay and an OFDM symbol in which the uplink signal sent by the second terminal device reaches the second access network device, where Noffset=NDelay−floor(NDelay/Nsymbol)×Nsymbol; and then determines the time adjustment amount NTA+, where NTA+=Nsymbol−Noffset. Nsymbol represents a time length of one OFDM symbol, and floor(x) represents a maximum integer that is not greater than x.

S402. The first access network device sends first indication information to the first terminal device, where the first indication information indicates the timing adjustment amount.

In this embodiment, the first access network device sends the time adjustment amount to the first terminal device, so that the first terminal device can learn of the timing of receiving, on the first frequency band, the downlink signal sent by the first access network device, to correctly receive the downlink signal.

In addition, in the foregoing solution, the first access network device sets the time adjustment amount, so that when the symbol in the downlink signal sent by the first access network device on the uplink frequency band reaches the second access network device, the symbol is aligned with the symbol in which the second access network device receives the uplink signal sent by the second terminal device, or the time difference is within the cyclic prefix. In this case, the second access network device can cancel the interference of the downlink signal. Therefore, the foregoing solution provides a means for enabling the second access network device to cancel the interference of the downlink signal.

The method further includes: sending, by the first access network device, second indication information to the first terminal device, where the second indication information indicates that the first terminal device uses the timing adjustment amount indicated by the first indication information. The first terminal device can adjust, according to an indication of the first access network device, the timing of receiving the first downlink signal.

The first access network device may send, in a semi-static manner, the time adjustment amount to a terminal device within a service range of the first access network device. A static manner means that the access network device presets a sending moment, which is directly used after being set and cannot be changed. A dynamic manner may be that the access network device sends the time adjustment amount by using physical layer signaling. The semi-static manner may be referred to as sending the time adjustment amount by using higher layer signaling or a broadcast message, and the like. For example, the first access network device may send the time adjustment amount by broadcasting a message at an interval of a specific time, or send the time adjustment amount by using higher layer signaling such as media access control (Media Access Control, MAC) layer signaling or radio resource control (Radio Resource Control, RRC) layer signaling. Compared with the dynamic manner, the semi-static manner can reduce control signaling overheads, and a message does not need to be frequently sent. Compared with the static manner, the semi-static manner is more flexible, and a time interval for sending a message can be changed based on an actual requirement.

In addition, the first access network device separately sends time adjustment amounts to a plurality of first terminal devices. The time adjustment amounts received by the plurality of first terminal devices may be the same or different.

In an example, the second indication information has two states. A first state of the second indication information may be used to indicate that the first terminal device uses the time adjustment amount to determine the timing at which the first terminal device receives the first downlink signal on the uplink frequency band. A second state of the second indication information may be used to indicate that the first terminal device does not use the time adjustment amount to determine the timing at which the first terminal device receives the first downlink signal on the uplink frequency band.

In an example, a signaling value of the second indication message includes 0 or 1. As shown in Table 1 below, if the signaling value of the second indication message is 0, it indicates that the first terminal device does not use the time adjustment amount to determine the receiving timing of the first downlink signal; or if the signaling value of the indication message is 1, it indicates that the first terminal device uses the time adjustment amount to determine the receiving timing of the first downlink signal.

TABLE 1

| Signaling value | Meaning |
| --- | --- |
| 0 | The first terminal device does not use the time adjustment amount to determine a receiving timing of a subframe |
| 1 | The first terminal device uses the time adjustment amount to determine a receiving timing of a subframe |

In addition, the first access network device may send the second indication information in an implicit manner. The implicit manner may be understood as adding the second indication information to other information and a signal, and sending the information and the signal to the terminal device. For example, the second indication message may be carried in a physical downlink control channel (Physical Downlink Control Channel, PDCCH) scrambling code sent to the first terminal device. When scrambling is performed by using a first scrambling code, the first scrambling code may be used to indicate that the first terminal device does not use the time adjustment amount to determine the receiving timing of the first downlink signal. When scrambling is performed by using a second scrambling code, the second scrambling code may be used to indicate that the first terminal device uses the time adjustment amount to determine the receiving timing of the first downlink signal. A method in which the first access network device instructs the first terminal device whether to use the time adjustment amount is not limited in this embodiment of the present invention.

Figure 5:
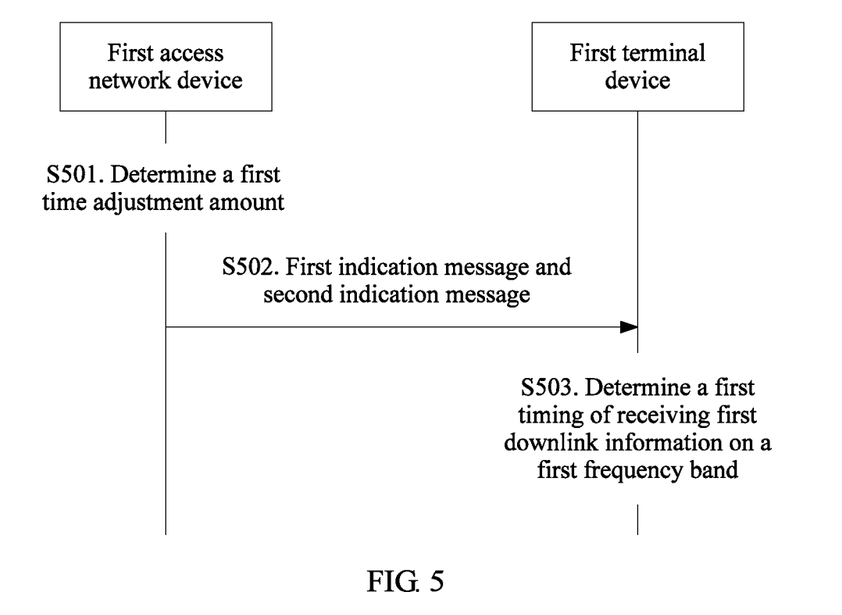
FIG. 5 is a schematic flowchart of an information receiving method according to an embodiment of the present invention.

FIG. 5 is a schematic flowchart of another communication method according to an embodiment of the present invention. As shown in FIG. 5, the method includes steps S501 to S503.

S501. A first access network device determines a first time adjustment amount.

The first timing adjustment amount is an adjustment amount between a first timing at which the first access network device sends a first downlink signal to a first terminal device on a first frequency band and a second timing at which the first access network device sends a second downlink signal to the first terminal device on a second frequency band. The first frequency band and the second frequency band are paired frequency bands.

In this embodiment of the present invention, the first frequency band is an uplink frequency band, and the second frequency band is a downlink frequency band.

In addition, the first access network device may directly determine the first time adjustment amount. For example, the first access network device obtains the first timing of the first downlink signal, and determines the first time adjustment amount based on a difference between the first timing and the second timing of the second downlink signal. Alternatively, the first access network device may not directly determine the first time adjustment amount. The first access network device obtains a difference between the first timing and the second timing, and sends the difference to the first terminal device.

In an example, alternatively, the first access network device may determine the first time adjustment amount based on a timing at which a second access network device receives the first downlink signal on the uplink frequency band. Alternatively, the first access network device may determine the first time adjustment amount based on a transmission time consumed by the first downlink signal to reach a second access network device. Alternatively, the first access network device may determine the first time adjustment amount based on a distance between the first access network device and a second access network device. A manner of determining the first time adjustment amount is not limited in this embodiment of the present invention.

In this embodiment of the present invention, there may be one or more second access network devices, and the second access network device may be a neighboring access network device of the first access network device, or may be an access network device that is relatively far away from the first access network device.

S502. The first access network device sends a first indication message and a second indication message to a first terminal device.

In this step, the first indication message is used to indicate the first timing adjustment amount, and the second indication message is used to indicate whether the first terminal device uses the first timing adjustment amount or a second timing adjustment amount.

A value of the second timing adjustment amount may be preset. The first timing is aligned with the second timing when the value of the second timing adjustment amount is 0.

S503. The first terminal device determines a first timing of receiving a first downlink message on a first frequency band.

In this step, the first terminal device determines, based on the first timing adjustment amount or the second timing adjustment amount indicated by the second indication information, and a second timing at which the first terminal device receives the second downlink signal from the first access network device on the second frequency band, the first timing at which the first terminal device receives the first downlink signal from the first access network device on the first frequency band.

In this embodiment, the first access network device sends a time adjustment amount to the first terminal device, so that the first terminal device can learn of the timing of receiving, on the first frequency band, the downlink signal sent by the first access network device, to correctly receive the downlink signal.

In addition, in the foregoing solution, the first access network device sets the time adjustment amount, so that when a symbol in the downlink signal sent by the first access network device on the uplink frequency band reaches the second access network device, the symbol is aligned with a symbol in which the second access network device receives an uplink signal sent by a second terminal device, or a time difference is within a cyclic prefix. In this case, the second access network device can cancel interference of the downlink signal. Therefore, the foregoing solution provides a means for enabling the second access network device to cancel the interference of the downlink signal.

In addition, the first terminal device receives the first downlink signal based on the first timing.

In the foregoing method, the second indication message includes a first state and a second state. The first state is used to indicate that the first terminal device uses the first time adjustment amount to determine the timing at which the first terminal device receives the first downlink signal on the uplink frequency band. The second state is used to indicate that the first terminal device uses the second time adjustment amount to determine the timing at which the first terminal device receives the first downlink signal on the uplink frequency band.

In an example, a signaling value of the second indication message may be 0 or 1. When the signaling value is 0, the signaling value is used to indicate that the first terminal device uses the first time adjustment amount to determine the timing at which the first terminal device receives the first downlink signal on the uplink frequency band. When the signaling value is 1, the signaling value is used to indicate that the first terminal device uses the second time adjustment amount to determine the timing at which the first terminal device receives the first downlink signal on the uplink frequency band. A manner of instructing the first terminal device by using the second indication message is not limited in this embodiment of the present invention.

In the foregoing method, the first access network device determines the first time adjustment amount, and adjusts, based on the first time adjustment amount, the sending timing of sending the first downlink signal on the uplink frequency band. The first access network device sends the first indication message and the second indication message to the first terminal device, so that the first terminal device can determine the timing of receiving, on the first frequency band, the downlink signal sent by the first access network device, to correctly receive the downlink signal. In addition, the second access network device receives the uplink signal from the second terminal device on the uplink frequency band. When the first downlink signal reaches the second access network device, the symbol carrying the first downlink signal is aligned with the symbol carrying the uplink signal, or the time difference between the symbol carrying the first downlink signal and the symbol carrying the uplink signal is less than or equal to a length of the cyclic prefix. The cyclic prefix is a cyclic prefix with a smaller length in a cyclic prefix of the symbol carrying the first downlink signal and a cyclic prefix of the symbol carrying the uplink signal. Therefore, the second access network device can cancel the interference of the first downlink signal.

Figure 6:
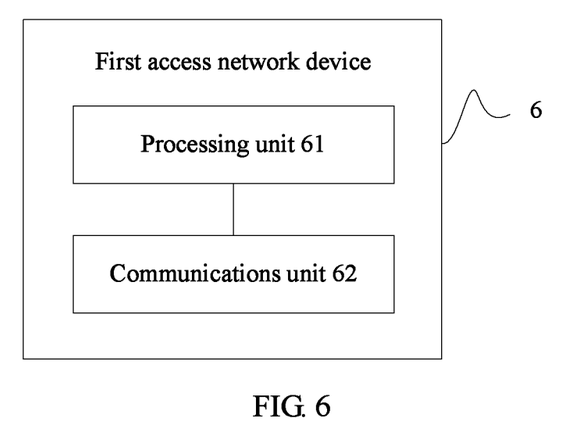
FIG. 6 is a schematic structural diagram of an access network device according to an embodiment of the present invention.

In the embodiments of the present invention, function unit division may be performed on the access network device, the terminal device, and the like based on the foregoing method examples. For example, each function unit may be obtained through division based on a corresponding function, or two or more functions may be integrated into one processing unit. FIG. 6 is a schematic structural diagram of an access network device according to an embodiment of the present invention. As shown in FIG. 6, the access network device is a first access network device 6, and the first access network device includes a processing unit 61 and a communications unit 62.

The processing unit 61 is configured to determine a timing adjustment amount, where the timing adjustment amount is an adjustment amount between a first timing at which the first access network device sends a first downlink signal to a first terminal device on a first frequency band and a second timing at which the first access network device sends a second downlink signal to the first terminal device on a second frequency band, and the first frequency band and the second frequency band are paired frequency bands.

The communications unit 62 is configured to send first indication information to the first terminal device, where the first indication information indicates the timing adjustment amount.

In this case, the first frequency band may be an uplink frequency band, and the second frequency band may be a downlink frequency band.

In addition, the first access network device may directly determine the time adjustment amount. For example, the first access network device obtains the first timing of the first downlink signal, and determines the time adjustment amount based on a difference between the first timing and the second timing of the second downlink signal. Alternatively, the first access network device may not directly determine the time adjustment amount. The first access network device obtains a difference between the first timing and the second timing, and sends the difference to the first terminal device.

In an example, alternatively, the first access network device may determine the time adjustment amount based on a timing at which a second access network device receives the first downlink signal on the uplink frequency band. Alternatively, the first access network device may determine the time adjustment amount based on a transmission time consumed by the first downlink signal to reach a second access network device. Alternatively, the first access network device may determine the time adjustment amount based on a distance between the first access network device and a second access network device. A manner of determining the time adjustment amount is not limited in this embodiment of the present invention.

In this embodiment of the present invention, there may be one or more second access network devices, and the second access network device may be a neighboring access network device of the first access network device, or may be an access network device that is relatively far away from the first access network device.

In the foregoing device, the communications unit 62 is further configured to send second indication information to the first terminal device, where the second indication information indicates that the first terminal device uses the timing adjustment amount indicated by the first indication information.

In an implementation, the second indication message includes a first state and a second state. The first state is used to indicate that the first terminal device does not use the time adjustment amount to determine a timing at which the first terminal device receives the first downlink signal on the uplink frequency band. The second state is used to indicate that the first terminal device uses the time adjustment amount to determine a timing at which the first terminal device receives the first downlink signal on the uplink frequency band.

In an example, a signaling value of the second indication message may be 0 or 1. When the signaling value is 0, the signaling value is used to indicate that the first terminal device does not use the time adjustment amount to determine the timing at which the first terminal device receives the first downlink signal on the uplink frequency band. When the signaling value is 1, the signaling value is used to indicate that the first terminal device uses the time adjustment amount to determine the timing at which the first terminal device receives the first downlink signal on the uplink frequency band.

In the foregoing device, the communications unit 62 is further configured to send the first downlink signal to the first terminal device on the first frequency band, where a second access network device receives an uplink signal from a second terminal device on the first frequency band, and when the first downlink signal reaches the second access network device, a symbol carrying the first downlink signal is aligned with a symbol carrying the uplink signal; or a time difference between a symbol carrying the first downlink signal and a symbol carrying the uplink signal is less than or equal to a length of a cyclic prefix, where the cyclic prefix is a cyclic prefix with a smaller length in a cyclic prefix of the symbol carrying the first downlink signal and a cyclic prefix of the symbol carrying the uplink signal.

In an implementation, the first access network device sends an indication message to the first terminal device, where the indication message is used to indicate whether the first terminal device uses a second timing adjustment amount or a first timing adjustment amount. The first timing adjustment amount is the foregoing timing adjustment amount, and a value of the second timing adjustment amount may be preset.

In an example, the preset value of the second timing adjustment amount is 0. In this case, the first timing is aligned with the second timing.

For details that are not described in this embodiment, refer to description of the communication methods shown in FIG. 4 and FIG. 5. Details are not described herein again.

Figure 7:
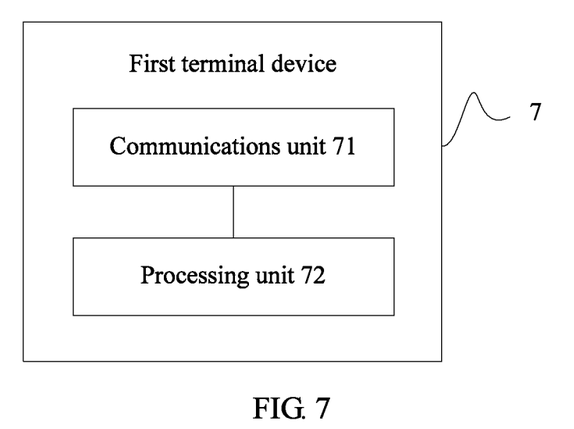
FIG. 7 is a schematic structural diagram of a terminal device according to an embodiment of the present invention.

FIG. 7 is a schematic structural diagram of a terminal device according to an embodiment of the present invention. As shown in FIG. 7, the terminal device is a first terminal device 7, and the first terminal device 7 includes a communications unit 71 and a processing unit 72.

The communications unit 71 is configured to receive first indication information from a first access network device, where the first indication information indicates a timing adjustment amount.

The processing unit 72 is configured to determine, based on the timing adjustment amount and a second timing at which the first terminal device receives a second downlink signal from the first access network device on a second frequency band, a first timing at which the first terminal device receives a first downlink signal from the first access network device on a first frequency band.

The processing unit 72 is configured to receive the first downlink signal based on the first timing.

In the foregoing device, the communications unit 71 is configured to receive second indication information from the first access network device, where the second indication information indicates that the first terminal device uses the timing adjustment amount indicated by the first indication information.

In the foregoing device, the processing unit 72 is configured to determine, based on the second indication information, the timing adjustment amount, and the second timing at which the first terminal device receives the second downlink signal from the first access network device on the second frequency band, the first timing at which the first terminal device receives the first downlink signal from the first access network device on the first frequency band.

In an implementation, the first terminal device receives an indication message sent by the first access network device, where the indication message is used to indicate whether the first terminal device uses a first time adjustment amount or a second time adjustment amount. The first time adjustment amount is the foregoing time adjustment amount, and the second time adjustment amount may be a preset value.

In an example, the preset value of the second timing adjustment amount is 0. In this case, the first timing is aligned with the second timing.

For details that are not described in this embodiment, refer to description of the communication methods shown in FIG. 4 and FIG. 5. Details are not described herein again.

Figure 8:
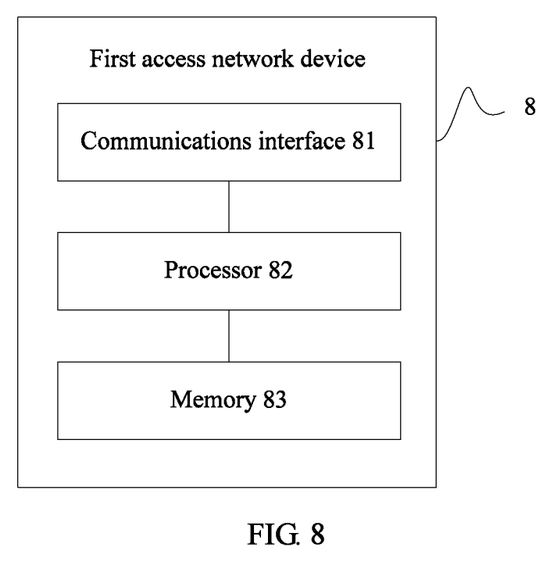
FIG. 8 is a schematic structural diagram of an entity apparatus of an access network device according to an embodiment of the present invention.

The integrated unit may be implemented in a form of software, or may be implemented in a form of a hardware function unit. It should be noted that, in this embodiment of the present invention, unit division is an example, and is merely logical function division. There may be another division manner in actual implementation. FIG. 8 is a schematic structural diagram of an entity apparatus of an access network device according to an embodiment of the present invention. As shown in FIG. 8, the access network device is a first access network device 8, and includes a communications interface 81, a processor 82, and a memory 83.

The communications interface 81, the processor 82, and the memory 83 are connected to each other.

The processor 82 is configured to execute the following events:

determining a timing adjustment amount, where the timing adjustment amount is an adjustment amount between a first timing at which the first access network device sends a first downlink signal to a first terminal device on a first frequency band and a second timing at which the first access network device sends a second downlink signal to the first terminal device on a second frequency band, and the first frequency band and the second frequency band are paired frequency bands; and sending first indication information to the first terminal device, where the first indication information indicates the timing adjustment amount.

Alternatively, the processor 82 may be configured to execute the following events:

determining a first timing adjustment amount, where the first timing adjustment amount is an adjustment amount between a first timing at which the first access network device sends a first downlink signal to a first terminal device on a first frequency band and a second timing at which the first access network device sends a second downlink signal to the first terminal device on a second frequency band, and the first frequency band and the second frequency band are paired frequency bands; and sending first indication information and second indication information to the first terminal device, where the first indication information indicates the first timing adjustment amount, and the second indication information is used to indicate whether the first terminal device uses a second timing adjustment amount or the first timing adjustment amount.

The communications interface 81 is configured to communicate with an external device.

The memory 83 may include a volatile memory (English: volatile memory), for example, a random access memory (English: random access memory, RAM for short); or the memory may include a non-volatile memory (English: non-volatile memory), for example, a flash memory (English: flash memory), a hard disk drive (English: hard disk drive, HDD for short), or a solid-state drive (English: solid-state drive, SSD for short); or the memory 83 may include a combination of the foregoing types of memories.

The processor 82 may be a central processing unit (English: central processing unit, CPU for short), a network processor (English: network processor, NP for short), or a combination of a CPU and an NP.

The processor 82 may further include a hardware chip. The hardware chip may be an application-specific integrated circuit (English: application-specific integrated circuit, ASIC for short), a programmable logic device (English: programmable logic device, PLD for short), or a combination thereof. The PLD may be a complex programmable logic device (English: complex programmable logic device, CPLD for short), a field programmable gate array (English: field programmable gate array, FPGA for short), or the like.

The memory 83 is configured to store the time adjustment amount.

In some embodiments, the memory 83 is further configured to store a program instruction. The processor 82 invokes the program instruction stored in the memory 83 to perform one or more steps in the communication method in FIG. 4, or an optional implementation thereof, so that the first access network device 8 implements the foregoing method.

For details that are not described in this embodiment, refer to description of the communication methods shown in FIG. 4 and FIG. 5. Details are not described herein again.

Figure 9:
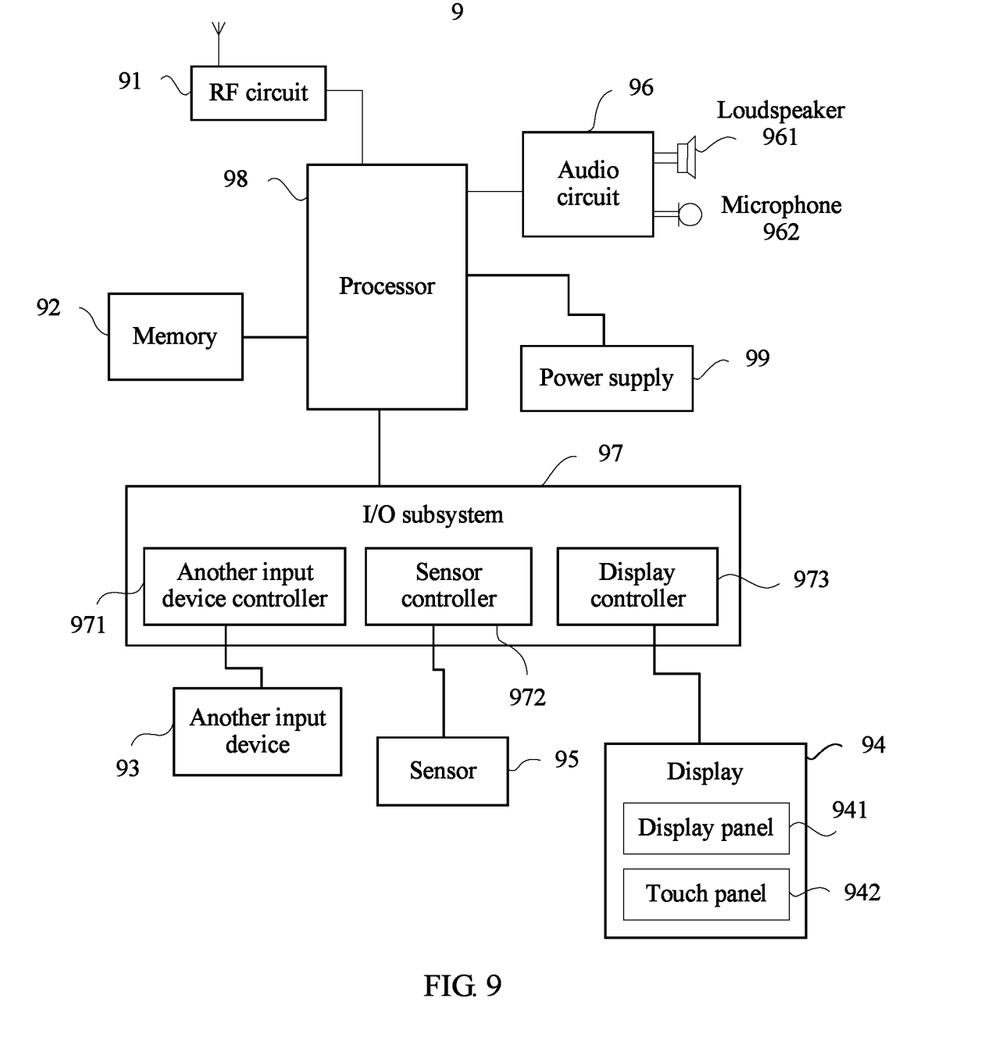
FIG. 9 is a schematic structural diagram of an entity apparatus of a terminal device according to an embodiment of the present invention.

FIG. 9 is a schematic structural diagram of an entity apparatus of a terminal device according to an embodiment of the present invention. As shown in FIG. 9, the terminal device is a first terminal device, and includes a communications interface 91, a processor 92, and a memory 93.

The terminal device in this embodiment of the present invention may include a mobile phone, a tablet computer, a PDA (Personal Digital Assistant, personal digital assistant), a POS (Point of Sale, point of sale), an in-vehicle computer, or the like.

For example, the terminal device is a mobile phone. FIG. 9 is a block diagram of a partial structure of a mobile phone 9 related to this embodiment of the present invention. Referring to FIG. 9, the mobile phone 9 includes components such as an RF (Radio Frequency, radio frequency) circuit 91, a memory 92, another input device 93, a display 94, a sensor 95, an audio circuit 96, an I/O subsystem 97, a processor 98, and a power supply 99. A person skilled in the art may understand that a structure of the mobile phone shown in FIG. 9 constitutes no limitation on the mobile phone, and the mobile phone may include more or fewer components than those shown in the figure, or may combine some components, or may split some components, or may have a different component arrangement. A person skilled in the art may understand that the display 94 is a user interface (UI, User Interface), and the mobile phone 9 may include more or fewer user interfaces than those shown in the figure.

The following specifically describes the components of the mobile phone 9 with reference to FIG. 9.

The RF circuit 91 may be configured to receive a signal and send a signal in an information receiving or sending process or a call process. In particular, after receiving downlink information of an access network device, the RF circuit 91 sends the downlink information to the processor 98 for processing, and sends related uplink data to the access network device. The RF circuit usually includes but is not limited to an antenna, at least one amplifier, a transceiver, a coupler, an LNA (Low Noise Amplifier, low noise amplifier), a duplexer, and the like. In addition, the RF circuit 91 may further communicate with a network and another device through wireless communication. The wireless communication may use any communication standard or protocol that includes but is not limited to a GSM (Global System for Mobile Communications, global system for mobile communications), a GPRS (General Packet Radio Service, general packet radio service), CDMA (Code Division Multiple Access, code division multiple access), WCDMA (Wideband Code Division Multiple Access, wideband code division multiple access), LTE (Long Term Evolution, long term evolution), an email, an SMS (Short Message Service, short message service), and the like.

The memory 92 may be configured to store a software program and a module. The processor 98 performs various function applications of the mobile phone 9 and data processing by running the software program and the module that are stored in the memory 92. The memory 92 may mainly include a program storage area and a data storage area. The program storage area may store an operating system, an application program required by at least one function (such as a sound playing function or an image playing function), and the like. The data storage area may store data (such as audio data or a phone book) created based on use of the mobile phone 9, and the like. In addition, the memory 92 may include a high-speed random access memory, and may further include a non-volatile memory, for example, at least one disk storage device, a flash memory device, or another volatile solid-state storage device.

The another input device 93 may be configured to: receive entered number or character information, and generate key signal input related to a user setting and function control of the mobile phone 9. Specifically, the another input device 93 may include but is not limited to one or more of a physical keyboard, a functional key (such as a volume control key or an on/off key), a track ball, a mouse, a joystick, an optical mouse (the optical mouse is a touch-sensitive surface that displays no visual output, or an extension of a touch-sensitive surface formed by a touchscreen), and the like. The another input device 93 is connected to another input device controller 971 of the I/O subsystem 97, and exchanges a signal with the processor 98 under control of the another device input controller 971.

The display 94 may be configured to display information entered by a user or information provided for the user, and various menus of the mobile phone 9, and may further accept user input. Specifically, the display 94 may include a display panel 941 and a touch panel 942. The display panel 941 may be configured in a form of an LCD (Liquid Crystal Display, liquid crystal display), an OLED (Organic Light-Emitting Diode, organic light-emitting diode), or the like. The touch panel 942, also referred to as a touchscreen, a touch-sensitive screen, or the like, may collect a touch or non-touch operation (for example, an operation performed by the user on the touch panel 942 or near the touch panel 942 by using any appropriate object or accessory such as a finger or a stylus; or a motion sensing operation, where the operation includes an operation type such as a single-point control operation or a multipoint control operation) performed by the user on or near the touch panel 942, and drive a corresponding connection apparatus based on a preset program. Optionally, the touch panel 942 may include two parts: a touch detection apparatus and a touch controller. The touch detection apparatus detects a touch position or a gesture of the user, detects a signal generated by the touch operation, and transfers the signal to the touch controller. The touch controller receives touch information from the touch detection apparatus, converts the touch information into information that can be processed by the processor, sends the information to the processor 98, and can receive and execute a command sent by the processor 98. In addition, the touch panel 942 may be implemented by using various types such as a resistive type, a capacitive type, an infrared type, and a surface acoustic wave type, or the touch panel 942 may be implemented by using any technology developed in future. Further, the touch panel 942 may cover the display panel 941, and the user may perform, based on content displayed on the display panel 941 (the displayed content includes but is not limited to a soft keyboard, a virtual mouse, a virtual key, an icon, and the like), an operation on or near the touch panel 942 covering the display panel 941. After detecting the operation on or near the touch panel 942, the touch panel 942 transfers the operation to the processor 98 by using the I/O subsystem 97 to determine user input, and then the processor 98 provides corresponding visual output on the display panel 941 based on the user input by using the I/O subsystem 97. Although in FIG. 9, the touch panel 942 and the display panel 941 serve as two independent components to implement input and input functions of the mobile phone 9, in some embodiments, the touch panel 942 and the display panel 941 may be integrated to implement the input and output functions of the mobile phone 9.

The mobile phone 9 may further include at least one sensor 95, such as a light sensor, a motion sensor, and another sensor. Specifically, the light sensor may include an ambient light sensor and a proximity sensor. The ambient light sensor may adjust luminance of the display panel 941 based on brightness of ambient light, and the proximity sensor may disable the display panel 941 and/or backlight when the mobile phone 9 approaches an ear of the user. As a type of motion sensor, an accelerometer sensor may detect a value of acceleration in each direction (generally, three axes), may detect a value and a direction of gravity in a static state, and may be used in an application for recognizing a mobile phone posture (such as screen switching between a landscape mode and a portrait mode, a related game, or magnetometer posture calibration), a function related to vibration recognition (such as a pedometer or a knock), and the like. Other sensors such as a gyroscope, a barometer, a hygrometer, a thermometer, or an infrared sensor may be further disposed in the mobile phone 9. Details are not described herein.

The audio circuit 96, a loudspeaker 961, and a microphone 962 may provide an audio interface between the user and the mobile phone 9. The audio circuit 96 may convert received audio data into a signal and transmit the signal to the loudspeaker 961. The loudspeaker 961 converts the signal into a sound signal for output. In addition, the microphone 962 converts a collected sound signal into a signal. The audio circuit 96 receives the signal, converts the signal into audio data, and outputs the audio data to the RF circuit 91 to send the audio data to, for example, another mobile phone, or outputs the audio data to the memory 92 for further processing.

The I/O subsystem 97 is configured to control external input and output devices, and may include the another device input controller 971, a sensor controller 972, and a display controller 973. Optionally, one or more other input control device controllers 971 receive a signal from the another input device 93 and/or send a signal to the another input device 93. The another input device 93 may include a physical button (such as a press button or a rocker button), a dial pad, a slider switch, a joystick, a click scroll wheel, and an optical mouse (the optical mouse is a touch-sensitive surface that displays no visual output, or an extension of a touch-sensitive surface formed by a touchscreen). It should be noted that the another input control device controller 971 may be connected to any one or more of the foregoing devices. The display controller 973 in the I/O subsystem 97 receives a signal from the display 94 and/or sends a signal to the display 94. After the display 94 detects user input, the display controller 973 converts the detected user input into interaction with a user interface object displayed on the display 94, to be specific, implements man-machine interaction. The sensor controller 972 may receive a signal from one or more sensors 95 and/or send a signal to one or more sensors 95.

The processor 98 is a control center of the mobile phone 9, connects all parts of the entire mobile phone by using various interfaces and lines, and performs various functions of the mobile phone 9 and processes data by running or executing the software program and/or the module that are/is stored in the memory 92 and by invoking data stored in the memory 92, thereby performing overall monitoring on the mobile phone. Optionally, the processor 98 may include one or more processing units. Preferably, the processor 98 may integrate an application processor and a modem processor. The application processor mainly processes an operating system, a user interface, an application program, and the like. The modem processor mainly processes wireless communication. It may be understood that, the modem processor may not be integrated into the processor 98.

The mobile phone 9 further includes the power supply 99 (such as a battery) that supplies power to each component. Preferably, the power supply may be logically connected to the processor 98 by using a power management system, to manage functions such as charging, discharging, and power consumption by using the power management system.

Although not shown, the mobile phone 9 may further include a camera, a Bluetooth module, and the like. Details are not described herein.

The processor 98 is configured to execute the following events:

receiving first indication information from a first access network device, where the first indication information indicates a timing adjustment amount;

determining, based on the timing adjustment amount and a second timing at which the first terminal device receives a second downlink signal from the first access network device on a second frequency band, a first timing at which the first terminal device receives a first downlink signal from the first access network device on a first frequency band; and receiving the first downlink signal based on the first timing. Alternatively, the processor 98 may be configured to execute the following events:

receiving first indication information from a first access network device, where the first indication information indicates a first timing adjustment amount;

receiving second indication information from the first access network device, where the second indication information indicates whether the first terminal device uses a second timing adjustment amount or the first timing adjustment amount;

determining, based on the first timing adjustment amount or the second timing adjustment amount indicated by the second indication information, and a second timing at which the first terminal device receives a second downlink signal from the first access network device on a second frequency band, a first timing at which the first terminal device receives a first downlink signal from the first access network device on a first frequency band; and receiving the first downlink signal based on the first timing.

For details that are not described in this embodiment, refer to description of the communication methods shown in FIG. 4 and FIG. 5. Details are not described herein again.

In this embodiment of the present invention, the first access network device sets the time adjustment amount, and adjusts the timing at which the first access network device sends the downlink signal on an uplink frequency band, so that when a symbol in the first downlink signal sent by the first access network device reaches a second access network device, and a symbol in an uplink signal sent by a second terminal device reaches the second access network device, the time domain symbols are aligned, or a time difference is within a cyclic prefix of the symbol. Then, the second access network device can cancel interference of the first signal.

A person skilled in the art may be further aware that, units and algorithm steps in the examples described with reference to the embodiments disclosed in this specification may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described with reference to the embodiments disclosed in this specification may be implemented by hardware, a software module executed by a processor, or a combination thereof. The software module may reside in a random access memory (RAM), memory, a read-only memory (ROM), an electrically programmable ROM, an electrically erasable programmable ROM, a register, a hard disk, a removable disk, a CD-ROM, or a storage medium in any other forms well-known in the art.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An information sending method performed by a first access network device, wherein the method comprises:
   determining a timing adjustment amount, wherein the timing adjustment amount is an adjustment amount between a first timing at which the first access network device sends a first downlink signal to a first terminal device on a first frequency band and a second timing at which the first access network device sends a second downlink signal to the first terminal device on a second frequency band, wherein the first frequency band and the second frequency band are paired frequency bands;
   sending first indication information to the first terminal device, wherein the first indication information indicates the timing adjustment amount;
   sending second indication information to the first terminal device, wherein the second indication information indicates that the first terminal device uses the timing adjustment amount indicated by the first indication information; and
   sending the first downlink signal to the first terminal device on the first frequency band, wherein a second access network device receives an uplink signal from a second terminal device on the first frequency band, and when the first downlink signal reaches the second access network device,
   a symbol carrying the first downlink signal is aligned with a symbol carrying the uplink signal; or
   a time difference between a symbol carrying the first downlink signal and a symbol carrying the uplink signal is less than or equal to a length of a cyclic prefix, wherein the cyclic prefix is a cyclic prefix of the symbol carrying the first downlink signal or a cyclic prefix of the symbol carrying the uplink signal, whichever of the cyclic prefixes has a smaller length.

2. An information receiving method performed by a first terminal device, wherein the method comprises:
   receiving first indication information from a first access network device, wherein the first indication information indicates a timing adjustment amount;
   determining, based on the timing adjustment amount and a second timing at which the first terminal device receives a second downlink signal from the first access network device on a second frequency band, a first timing at which the first terminal device receives a first downlink signal from the first access network device on a first frequency band, wherein the first frequency band and the second frequency band are paired frequency bands;
   receiving second indication information from the first access network device, wherein the second indication information indicates that the first terminal device uses the timing adjustment amount indicated by the first indication information; and
   receiving the first downlink signal based on the first timing, wherein a second access network device receives an uplink signal from a second terminal device on the first frequency band, and when the first downlink signal reaches the second access network device:
   a symbol carrying the first downlink signal is aligned with a symbol carrying the uplink signal; or
   a time difference between a symbol carrying the first downlink signal and a symbol carrying the uplink signal is less than or equal to a length of a cyclic prefix, wherein the cyclic prefix is a cyclic prefix of the symbol carrying the first downlink signal or a cyclic prefix of the symbol carrying the uplink signal, whichever of the cyclic prefixes has a smaller length.

3. The method according to claim 2, wherein
   determining the first timing comprises:
   determining, based on the second indication information, the timing adjustment amount, and the second timing at which the first terminal device receives the second downlink signal from the first access network device on the second frequency band, the first timing at which the first terminal device receives the first downlink signal from the first access network device on the first frequency band.

4. An information sending method performed by a first access network device, wherein the method comprises:
   determining a first timing adjustment amount, wherein the first timing adjustment amount is an adjustment amount between a first timing at which the first access network device sends a first downlink signal to a first terminal device on a first frequency band and a second timing at which the first access network device sends a second downlink signal to the first terminal device on a second frequency band, wherein the first frequency band and the second frequency band are paired frequency bands;
   sending first indication information and second indication information to the first terminal device, wherein the first indication information indicates the first timing adjustment amount, and the second indication information indicates whether the first terminal device uses a second timing adjustment amount or the first timing adjustment amount;
   sending the first downlink signal to the first terminal device on the first frequency band, wherein a second access network device receives an uplink signal from a second terminal device on the first frequency band, and when the first downlink signal reaches the second access network device:
   a symbol carrying the first downlink signal is aligned with a symbol carrying the uplink signal; or
   a time difference between a symbol carrying the first downlink signal and a symbol carrying the uplink signal is less than or equal to a length of a cyclic prefix, wherein the cyclic prefix is a cyclic prefix of the symbol carrying the first downlink signal or a cyclic prefix of the symbol carrying the uplink signal, whichever of the cyclic prefixes has a smaller length.

5. The method according to claim 4, wherein the second timing adjustment amount is a preset value.

6. The method according to claim 5, wherein the preset value of the second timing adjustment amount is 0.

* * * * *